Patented Dec. 22, 1953

2,663,668

UNITED STATES PATENT OFFICE 2,663,668

PROCESS FOR PRODUCING ARGINASE

Ved Vrat, Belmont, Calif., assignor to The Permanente Foundation, Oakland, Calif., a charitable trust No Drawing. Application August 9, 1951, Serial No. 241,153

9 Claims. (Cl. 195—66)

This invention relates to the preparation of arginase; and more particularly it relates to the production of a high-potency arginase which can be injected into an animal organism.

A number of processes have hitherto been developed for the preparation of arginase-containing products; and it has been known that these products, or more precisely, the arginase component thereof, could be employed to hydrolyze arginine to urea and ornithine. However, in all of the known methods, the products obtained have been contaminated with large amounts of impurities, including other proteins, pyrogens, etc.; and the presence of these impurities has limited the use of the material produced. For instance, products so made could not be injected into an animal organism without resulting in anaphylatic shock or death. In some of the prior methods, destruction of appreciable amounts of the enzyme occurs and the yields therefore are low, as well as exhibiting the other disadvantages as to the presence of impurities, and the products are comparatively less active.

It is an object of the present invention to provide a method for producing high-potency arginase. It is another object to provide an economical method for producing good yields of high-potency and high-purity arginase, based on the amounts available in the starting material. It is a still further object to provide an arginase product of very high potency; more particularly, an arginase product which can be injected into animals with substantial safety and to effect advantageous physiological changes or results. It is a further object to provide an arginase free from other enzymes, particularly esterase and catalase.

According to the present invention, an arginase-containing, or arginase-yielding raw material, which is a biological tissue, such as animal or vegetable cell material or tissue, is extracted with water containing an activator for arginase, while maintaining the extraction mixture at a pH of from about 7.0 to about 9.5, and separately recovering the liquid portion. The recovered liquid is extracted with acetone at a temperature of not over about 5° C. to precipitate proteins; and the liquid portion from this extraction is recovered and again mixed with acetone at not over about 5° C. and the precipitate resulting from this treatment, which is enriched in arginase, is recovered. This precipitate is now dissolved in water and the solution is heated to from 60° C. to 80° C., preferably about 75° C., and is then rapidly cooled, to a temperature at which it is still liquid but of not over about 3° C., whereby the major portion of the residual impurities is precipitated. The clear solution is separately recovered and contains arginase of good potency. This solution is now admixed with a lead salt in an amount to provide not over 0.25 milligram of lead ion (Pb++) per cubic centimeter of solution to precipitate further amounts of undesired proteinaceous material; the precipitate is removed and the solution is admixed with from a little over half to about three-fourths of its volume of acetone, and the precipitate so produced is removed. The clear solution which is recovered is admixed with more than 0.5 its volume of acetone and the highly purified arginase-yielding product is obtained as a precipitate. This product contains both arginase and its proenzyme and it is preferably activated by dissolving in a minimum amount of water containing an activator, preferably a cobaltous compound, or a compound yielding cobaltous ions, incubating for about an hour (40° C.), and recovering the clear solution.

The starting material can be any biological tissue containing arginase such as, for example, liver or kidney of mammals, birds or fishes, yeasts, fungi, vegetables, such as asparagus or beets, dead cultures of bacteria and the like. Mixtures of such starting materials can be used. Preferably the starting material is liver or kidney because of the higher content of enzyme in such material, and of these, horse liver or beef liver is preferred.

Advantageously, the starting material is dried before the extraction process is begun; but the enzyme or proenzyme can also be extracted from material which has not been dried. It is preferred to dry the starting tissue by extraction with acetone or ethyl ether. In any event, the tissue is dried by one of the methods as known in the art which do not destroy the enzymes.

The activator employed in the various steps of the process can be any of the known activators for this enzyme. However, at the final stage of the process, in order to produce the highest amount of high-potency enzyme, a cobaltous-ion yielding compound is employed, either alone or together with a manganous-ion yielding compound. The activators which can be employed, alone or together, include water-soluble salts of cobalt and manganese, for example, cobaltous acetate, cobaltous nitrate, cobaltous sulfate, manganous sulfate, manganous dihydrogen phosphate, and other water-soluble, ionizing cobaltous or manganous salts. An arginase product having a superior, uniform high-potency is obtained when cobaltous ion is employed as activator. The starting material is admixed with an activator in the presence of water at a pH of from 7.0 to 9.5, preferably at pH 7.5. It is preferred that the material or materials being processed be maintained at a pH of from 7.0 to 9.5, most suitably at 7.5, during all the stages of the process.

The liquid portion, or water solution containing arginase and pro-arginase, and many impurities, is recovered from the activated starting material mixture described, suitably by decanting, filtering or centrifuging, and is admixed with from slightly in excess of half to about three-fourths of its volume of acetone. There is formed a precipitate of undesired material which is composed predominantly of proteinaceous substances. This acetone extraction, or precipitation step, is carried out at a low temperature, that is from the lowest temperature at which the mixture is liquid, or about $-5°$ C., to about $5°$ C.; but the optimum temperature of the extraction is $3°$ C. The clear liquid is recovered, suitably by filtering or other method, and is again extracted with from slightly in excess of one-half to about three-fourths, preferably 0.7, of its volume of acetone. There is thereby precipitated a material or fraction enriched in arginase proenzyme and arginase.

This precipitate, or arginase-enriched fraction, is dissolved in water, preferably as small amount as possible, and the solution is heated to from $60°$ C. to $80°$ C., preferably to about $75°$ C., and this heated solution is then cooled as rapidly as possible to a temperature of not over $3°$ C., but at which it is still liquid, preferably about $3°$ C. A further amount of impurities is thereby precipitated and the mixture is, suitably, filtered or centrifuged to recover the clear solution.

The solution thus obtained is further enriched in arginase and some pro-arginase but for many purposes, particularly for injection into an animal organism, a still more highly purified product is desired. With this solution, therefore, is then admixed a lead salt, such as, for example, lead acetate, lead nitrate, but excepting lead citrate and lead borate, which inhibit the activity of the enzyme, the lead salt being added in an amount to provide not over 0.25 milligram of lead ions ($Pb++$) per milliliter (cc.) of solution; whereupon a precipitate forms and is removed, suitably by filtering or centrifuging, and the liquid portion recovered. The liquid portion is then mixed with from over one-half to about three-fourths, preferably 0.7, volume of acetone, based on the volume of the liquid portion, and a precipitate is formed, which is removed, suitably by filtering or centrifuging, and the liquid portion again recovered. This liquid portion is then admixed with at least 0.5 its volume of acetone, preferably from 0.5 to 1.0 volume, and the precipitate so formed is highly purified arginase and pro-arginase. More than one volume of acetone is operative but is wasteful. This precipitate is then dissolved in a minimum amount of water and is activated by adding to the solution cobaltous salt to provide a total of not over 0.25 mg. per cc. of solution, preferably about 0.125 mg. per cc., of cobaltous ions, and maintaining the whole, preferably at a temperature of about $40°$ C., preferably for about an hour. The enzyme can alternatively be activated, for example, if it is to be used immediately, by adding manganous ions, in the same amounts; but if the enzyme is to be injected into an animal organism or is to be stored, shipped, or not immediately used, it is preferred to activate by adding at least a portion of the activator as cobaltous ion-yielding material because it is found that activation is more efficient, more uniform, and more stable, when cobaltous ion is present.

The precipitate obtained after precipitation with lead ions and fractionation with acetone contains at least about 90% of arginase; and usually contains about 93.5% to 98.5% arginase. The arginase so obtained is of high purity and high potency and is particularly characterized by substantial freedom from esterase and catalase. Because of these characteristics it is useful for many purposes, but especially it is a product which can be injected into an animal organism to effect desired physiological changes, for instance, as hereinbelow set forth. The purified arginase has been injected into cancerous mice, as will be more fully described; and it has also been injected into humans with advantageous results.

The purified arginase obtained by this invention is useful for hydrolyzing arginine to form ornithine and urea. The high potency and high purity arginase obtained by this process wherein the arginase is activated with the aid of cobaltous ions can be injected into animal organisms (for example, subcutaneously, intromuscularly or intravenously) and functions to cause regression of tumors in cancerous mice, to cause decrease in weight, expelling of the foetus at any stage of gestation, and to delay healing in wounds, and the like. In mice, for instance, 100 A. U. have been injected daily for ten days, into mice having large spontaneous mammary tumors, the injections being administered intraperitoneally; and at the end of ten days, the tumors are observed to have decreased about 70% in size and to be substantially not observable. In control mice maintained on the same diet and under exactly the same conditions, and having approximately the same size tumors at the start of the test, no regression, or decrease in size, of the tumor was noted in each case and, in fact, it increased tremendously, resulting eventually in the death of the animal. In treating malignancies in an animal organism and in hydrolyzing bound arginine in tissue, at least partial activation of the arginase with cobaltous ion is essential.

In the operation of the process, the pH is maintained at all times at from 7.0 to 9.5, preferably at pH 7.5; and can be adjusted in the known manner, for example, gross adjustments being made by the addition of sodium hydroxide or sulfuric acid, and preferably by adding one or more buffers such as Sorenson phosphate buffers. Preferably, the activator employed is manganous sulfate or cobaltous nitrate or both; and if to be injected at least a substantial portion of the activator is a cobaltous salt. Where water is employed in the process, distilled water is meant. The presence of citrate and borate ions from any source is to be avoided in the process, because these inhibit the activity of arginase. All acetone extractions are to be carried out at not over $5°$ C., and, of course, at temperatures at which the solution in question is liquid, that is, not frozen. Instead of the starting material shown in the example, other animal tissues containing arginase can be used, fungi, killed bacterial cultures, vegetables, for example, beets or asparagus. In order to maintain maximum activity, an activator as described is added at any desired stage of the process to maintain not over 0.25 mg., preferably to maintain 0.125 mg., divalent Co or Mn ion per ml. of arginase solution.

The arginase content is determined by a method as described by M. S. Mohamed and D. M. Greenberg, Archives of Biochemistry, vol. 6, p. 349 (1945), published by Academic Press, Inc. In this method aliquots of arginase solution are allowed to act for fifteen minutes or more on 0.2 ml. portions of 0.2 M arginine solution (at pH 7.0) mixed with 7.7 ml. of a selected buffer. The reaction is then stopped by adding acetic acid and the urea formed is determined as xanthydrol-urea by precipitation, the latter being determined by oxidation with a sulfuric acid solution of potassium dichromate. Enzyme activity is expressed as A. U. and enzyme purity as A. P., by this method, by the calculations shown in the noted reference.

The process and product of this invention will be illustrated more clearly by the following example:

Example

To 100 gms. of acetone-dried liver are added 1000 cc. re-distilled water containing 0.75 gm. manganous sulfate, and the whole is adjusted to pH 7.5 and allowed to stand overnight at 3° C. The supernatant water solution is recovered by centrifuging, at 3° C., and is mixed with 0.75 vol. cold acetone and allowed to stand overnight. The supernatant solution from this treatment is recovered by centrifuging and a little over one-half volume of acetone is admixed therewith, at 3° C., and again the whole is allowed to stand about 12 hours; and is then centrifuged to recover the precipitate which is formed. The precipitate is dissolved in distilled water and there are added to the solution 0.15 gm. manganous sulfate and 0.15 gm. cobaltous nitrate, the pH is adjusted to 7.5, and the solution heated to 75° C. It is then cooled rapidly (within about 5 min.) to 3° C., and the supernatant solution recovered. To this solution is added lead acetate to provide 0.25 mg. lead ions (Pb++) per milliliter, the pH is adjusted to 7.5, and the whole is allowed to stand for about 2 hours at room temperature, whereupon a precipitate forms, and is centrifuged off, with recovery of the supernatant solution. With the latter is mixed 0.75 vol. acetone, at 3° C., and the mixture allowed to stand in the cold for about 12 hours, and the precipitate which forms is centrifuged off. To the supernatant solution so recovered is added one-half volume of cold acetone, and the whole is allowed to stand overnight and is then centrifuged to recover the precipitate. The precipitate thus obtained is dissolved in a minimal amount of water (about 15 cc., in this example), and to this solution is added sufficient cobaltous nitrate to provide a total of 0.25 mg. of cobaltous ions (Co++) per milliliter; and the solution is adjusted to pH 7.5, incubated for 1 hour (40° C.), and centrifuged. The solute of the liquid solution contains 98.5% arginase.

It is to be understood that the above example and specific illustration have been given for purposes of illustration only; and variations and modifications can be made therein without departing from the spirit and scope of the appended claims. Percentages and parts as given herein are by weight unless otherwise indicated; the terms "milliliter" and "cubic centimeter" are used as synonyms; the terms "in excess of," "over" and "more than" are used synonymously, as with reference to amounts.

What is claimed is:

1. In a process for producing arginase, the improvement which comprises drying biological tissue, admixing therewith water containing at least one activator for arginase chosen from the group consisting of cobaltous nitrate, cobaltous sulfate, manganous sulfate and manganous dihydrogen phosphate while maintaining said admixture at a pH of from 7.0 to 9.5, separately recovering the liquid portion of said mixture, extracting said liquid portion with from over one-half to three-fourths its volume of acetone while maintaining said extraction mixture at not over about 5° C., whereby proteins are precipitated, recovering the liquid portion of said extraction mixture, admixing said liquid with a second portion of from over one-half to three-fourths its volume of acetone while maintaining said mixture at not over about 5° C., whereby an arginase-enriched fraction is precipitated, dissolving said precipitate in water, heating said solution to from 60° C. to 80° C., rapidly cooling said solution to not over 3° C. whereby a precipitate is formed, separately recovering the solution portion, admixing with said solution portion a lead salt in amount to provide not over 0.25 mg. of lead ions per cc. of solution, whereby a precipitate is formed, separately recovering the resultant solution portion, admixing with said resultant solution from more than one-half to about three-fourths volume of acetone whereby a precipitate is formed, separately recovering the solution portion, admixing therewith at least one-half its volume of acetone, and recovering the resultant precipitate.

2. Process as in claim 1 wherein said activator is added in an amount to provide not over about 0.25 mg. divalent metal ion per cubic centimeter of said solution.

3. Process as in claim 1 wherein said activator is added in an amount to provide 0.125 mg. divalent metal ion per cubic centimeter of said solution.

4. Process as in claim 1 wherein said activated mixture is maintained at a pH of 7.5.

5. Process as in claim 1 wherein the solution recovered from said precipitated arginase-containing fraction is heated to 75° C.

6. Process as in claim 1 wherein said arginase-containing tissue is liver.

7. Process as in claim 1 wherein said arginase-containing tissue is fungi.

8. Process for producing arginase which comprises comminuting liver, extracting said comminuted liver with acetone to remove water therefrom, admixing said extracted tissue with a water solution of at least one substance chosen from the group consisting of cobaltous nitrate, cobaltous sulfate, manganous sulfate and manganous dihydrogen phosphate and containing not over 0.25 mg. Co++ or Mn++ ions substance per milliliter of solution, to activate the arginase of said tissue, separately recovering the liquid portion of said mixture, admixing said liquid portion with about 0.75 its volume of acetone while maintaining said admixture at about 3° C. to precipitate substantially inert proteins, recovering the liquid portion of said mixture, admixing said liquid portion with about 0.7 volume of acetone while maintaining said mixture at about 3° C. to precipitate an arginase-rich fraction, separately recovering said precipitated fraction, admixing said precipitated fraction with water, heating said admixture to about 75° C., suddenly cooling said mixture to about 3° C. whereby a precipitate is formed, separately recovering the solution, and admixing said solution with a lead salt in an amount to provide not over 0.25 milligram of lead ions per milliliter of solution, separately recovering the liquid portion, mixing said liquid portion with 0.7 volume of acetone, separately recovering the liquid portion, admixing said last-mentioned liquid portion with from more than one-half to one times its volume of acetone, and separately recovering precipitated purified arginase.

9. Process as in claim 8 wherein said purified arginase precipitate is mixed with a water solution of cobaltous sulfate containing about 0.125 mg. per cc. cobaltous ion to complete activation.

VED VRAT.

OTHER REFERENCES

Richards et al., J. Biol. Chem. 134 (1940), pages 237 to 252.

Hunter et al., ibid. 155 (1944), pages 173 to 181.

Mohamed et al., Arch. Biochemistry, 8 (1945), pages 349 to 364 (pages 356 to 359 relied upon).

Tauber, Chem. and Tech. of Enzymes, 1949, John Wiley and Sons, N. Y., page 116.

Sumner et al., The Enzymes, vol 1, part 2, 1951, Academic Press, N. Y., pages 904 to 906.

Science, vol. 94, August 8, 1941, page 144.